(12) United States Patent
Kaminski et al.

(10) Patent No.: US 6,239,527 B1
(45) Date of Patent: May 29, 2001

(54) NON-CIRCULAR FIELD WINDING ENCLOSURE

(75) Inventors: Christopher A. Kaminski; Yu Wang, both of Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/491,573

(22) Filed: Jan. 26, 2000

(51) Int. Cl.$^7$ ................................................... H02K 17/32
(52) U.S. Cl. .............................. 310/168; 310/89; 310/261
(58) Field of Search .................................. 310/261, 89, 91, 310/168, 166, 162, 262, 264, 265; 29/596–598

(56) References Cited

U.S. PATENT DOCUMENTS

| | | | |
|---|---|---|---|
| 2,119,477 | * 5/1938 | Weydell | 310/168 |
| 3,062,979 | * 11/1962 | Jarret | 310/166 |
| 3,132,269 | * 5/1964 | Craske | 310/166 |
| 3,900,749 | * 8/1975 | Carriker | 310/156 |
| 4,506,182 | * 3/1985 | Rohdin | 310/193 |
| 5,359,248 | * 10/1994 | Nagate et al. | 310/156 |
| 5,650,682 | * 7/1997 | Smart | 310/181 |
| 5,808,389 | * 9/1998 | Stephenson | 310/168 |
| 5,844,343 | * 12/1998 | Horst | 310/184 |

* cited by examiner

*Primary Examiner*—Tran Nguyen
(74) *Attorney, Agent, or Firm*—Nixon & Vanderhye P.C.

(57) ABSTRACT

An enclosure formed of a non-magnetic material occupies space in the non-magnetic gap between the rotor and stator. As the enclosure thickness increases, the size of the air gap, which is the non-magnetic gap minus the enclosure thickness, becomes smaller, and the resistance to the axial flow of gas coolant decreases. A non-circular shaped enclosure provides additional area between the rotor and stator for axial transfer of gas and minimizes the non-magnetic gap at the d-axis while maximizing the air gap at the q-axis. The shape of the enclosure also reduces the centrifugal force in the vicinity of the q-axis and delivers a more circular shape as a result of the deformation at operating speed.

15 Claims, 3 Drawing Sheets

NON-CIRCULAR FIELD WINDING ENCLOSURE

BACKGROUND OF THE INVENTION

The present invention relates to generators and, more particularly, to a field winding enclosure having a non-circular shape.

In a conventional generator having a rotor and a stator, the rotor is provided with field windings that excite the generator while receiving a current from an exciting current source. The stator is provided with armature windings from which electrical power is output. Containment of the rotor field windings can be achieved by enclosing the assembly in an enclosure, which eliminates the need for rotor wedges, rotor teeth and retaining rings.

Reluctance is the magnetic analog to resistance in an electric circuit. The reluctance of a magnetic circuit in an electric power generator is most sensitive to the size in the gap between the generator rotor and stator along the rotor pole direction (d-axis), where most of the flux transfer takes place, and is least sensitive 90° away (along the q-axis). Centrifugal loading, on the other hand, is primarily distributed along the q-axis.

BRIEF SUMMARY OF THE INVENTION

In an exemplary embodiment of the invention, an enclosure for a rotor in a generator is formed of a non-circular shape and preferably of a non-magnetic material. The enclosure may be formed of a filament wound tube or alternatively of a plurality of filament wound rings. The non-circular shape is preferably substantially oval corresponding to two or three arc segments for each quadrant. The enclosure may be shaped to provide a circular curvature over each pole face of the rotor. In the context of the three arc segments, each circular curvature is substantially concentric with a rotor axis of rotation.

In another exemplary embodiment of the invention, a rotor in a generator includes a two-pole magnetic core, two core assemblies, one for each pole, and an enclosure housing the core and the core assemblies, wherein the enclosure is formed of a non-circular shape.

DETAILED DESCRIPTION OF THE INVENTION

Figure 1:
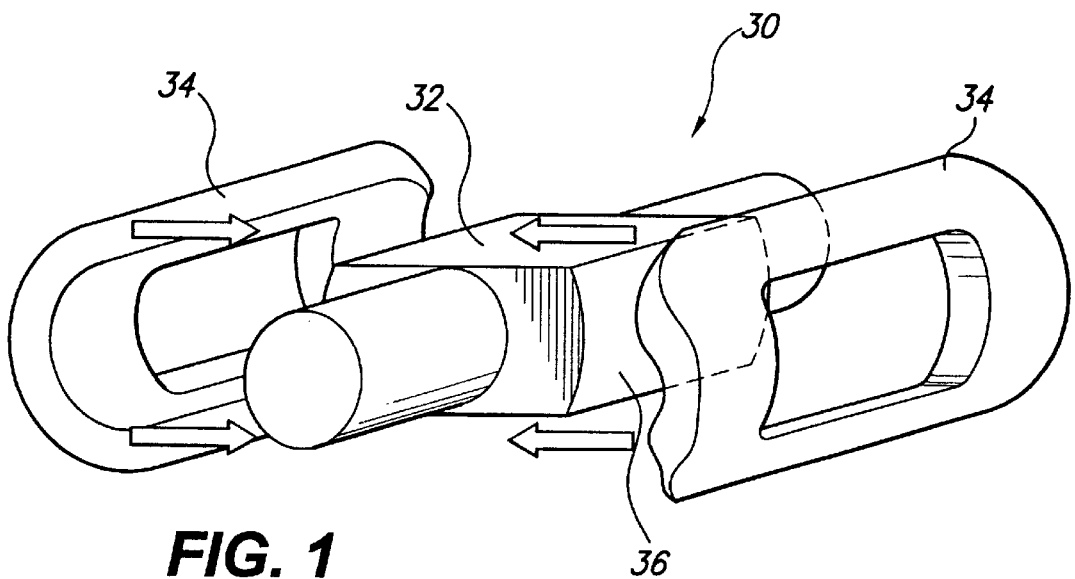
FIG. 1 is a winding assembly drawing of a generator rotor.
Figure 2:
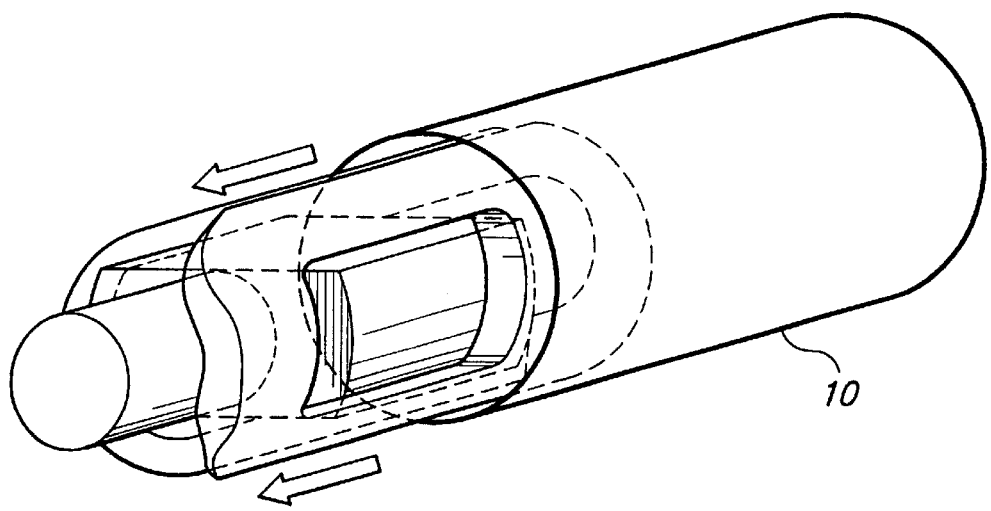
FIG. 2 is an assembly drawing of a generator rotor including the enclosure of the present invention.

With reference to FIGS. 1 and 2, a generator rotor 30 includes a two-pole magnetic core 32 and two winding assemblies 34, one for each pole, and corresponding pole faces 36. The construction and materials of the magnetic core 32 and winding assemblies 34 are known, and details thereof will not be further provided.

After the winding assemblies 34 are slid over the parallel sided forging of the two-pole magnetic core 32, an enclosure 10 is slid over the assembly. The enclosure 10 itself is preferably a filament wound tube or may alternatively be constructed of individual rings.

Figure 3:
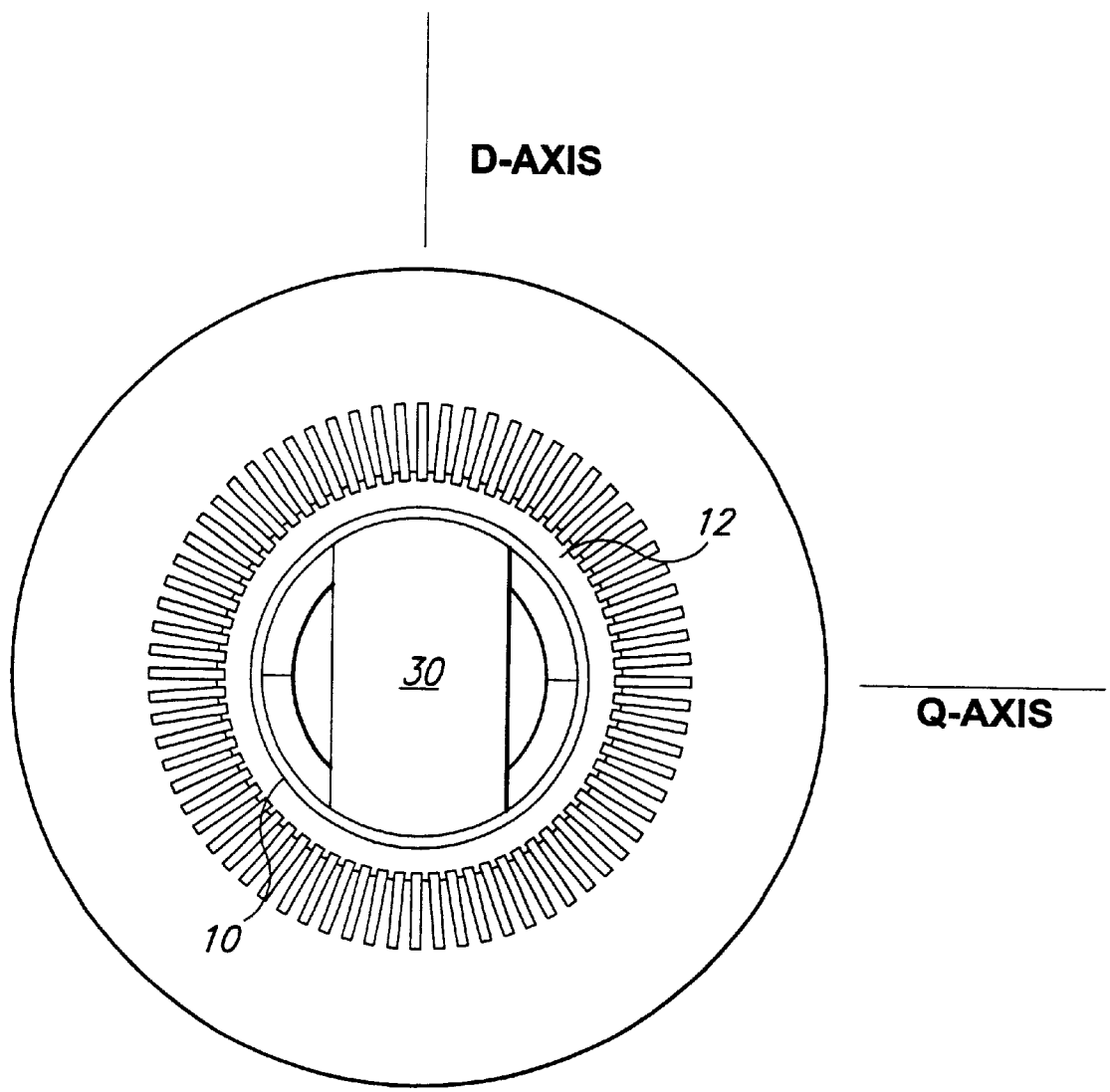
FIG. 3 is a schematic illustration of a generator rotor and stator and the enclosure of the present invention.

FIG. 3 is a schematic illustration of an assembled generator stator and rotor. As shown, the rotor assembly 30 is housed within the enclosure 10, and a gap 12 is defined between the stator and rotor. The enclosure 10 is formed of a non-circular shape, such as a substantially oval shape as shown. The larger diameter of the oval shape is configured along the d-axis, with the smaller diameter configured along the q-axis. With this construction, the non-magnetic gap 12 is minimized at the d-axis, while maximizing the air gap along the q-axis.

As noted, the reluctance of the generator magnetic circuit is most sensitive to the size of the gap along the rotor pole direction or d-axis, where most of the flux transfer takes place, and least sensitive along the q-axis. Thus, by minimizing the gap at the d-axis and maximizing the gap at the q-axis, the resistance to axial flow of gas coolant decreases without significantly affecting the magnetic circuit. As a consequence, an additional area is provided between the rotor and stator for the axial transfer of cooling gas. The non-circular shape of the enclosure also reduces the centrifugal force in the vicinity of the q-axis and delivers a more circular shape as a result of deformation at operating speed.

Figure 5:
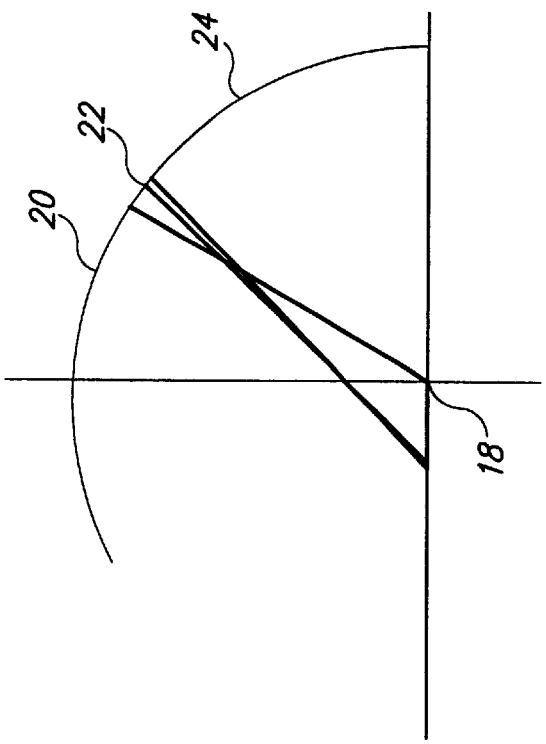
FIG. 5 illustrates the three arc segments for the non-circular enclosure in another embodiment of the invention.
Figure 4:
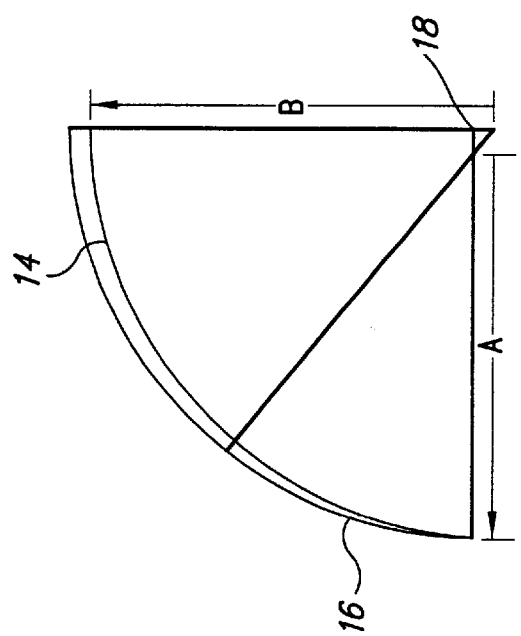
FIG. 4 illustrates the two arc segments for the non-circular enclosure in one embodiment of the invention.

Preferably, the non-circular enclosure incorporates a circular curvature over each pole face 36 formed via two or three arc segments for each quadrant of the enclosure. FIG. 4 illustrates the second quadrant of the non-circular enclosure formed using two arc segments 14, 16. Arc segment two 14 in this arrangement provides the circular curvature over the pole face. Reference 18 indicates the rotor axis of rotation. FIG. 5 illustrates the first quadrant of the non-circular enclosure using three arc segments 20, 22, 24. Arc segment one 20 in this arrangement provides the circular curvature over the pole face. As seen in FIG. 5, the curvature of arc segment one 20 over each pole face is concentric with the rotor axis of rotation 18.

The non-circular shaped enclosure also serves as an additional locking mechanism for securing the enclosure at overspeed conditions, while providing a centrifugally driven self-centering mechanism for positioning the winding. Moreover, the shape provides a turbulation mechanism to enhance convective heat transfer to the gas coolant.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An enclosure for a rotor in a generator including the rotor and a stator, the rotor enclosure being formed of a non-circular shape, wherein a periphery of the non-circular shape is defined in four quadrants, and wherein the non-circular shape is substantially oval corresponding to at least two arc segments for each quadrant.

2. An enclosure for a rotor according to claim 1, wherein the enclosure is formed of a non-magnetic material.

3. An enclosure for a rotor according to claim 1, wherein the enclosure is formed of a filament wound tube.

4. An enclosure for a rotor according to claim 1, wherein the enclosure is formed of a plurality of rings.

5. An enclosure for a rotor according to claim 1, wherein the non-circular shape is substantially oval corresponding to three arc segments for each quadrant.

6. An enclosure for a rotor according to claim 5, wherein one of the arc segments defines a circular curvature over each pole face of the rotor, and wherein the one of the arc segments is substantially concentric with a rotor axis of rotation.

7. An enclosure for a rotor according to claim 1, wherein the enclosure is shaped to define a circular curvature over each pole face of the rotor.

8. A rotor in a generator comprising:

a two-pole magnetic core;

two core winding assemblies, one for each pole; and an enclosure housing the core and the core winding assemblies, wherein the enclosure is formed of a non-circular shape.

9. A rotor according to claim 8, wherein the enclosure is formed of a non-magnetic material.

10. A rotor according to claim 8, wherein the enclosure is formed of a filament wound tube.

11. A rotor according to claim 8, wherein the enclosure is formed of a plurality of rings.

12. A rotor according to claim 8, wherein a periphery of the enclosure non-circular shape is defined in four quadrants, and wherein the non-circular shape is substantially oval corresponding to two arc segments for each quadrant.

13. A rotor according to claim 8, wherein a periphery of the enclosure non-circular shape is defined in four quadrants, and wherein the non-circular shape is substantially oval corresponding to three arc segments for each quadrant.

14. A rotor according to claim 12, wherein each pole of the magnetic core comprises a pole face, and wherein one of the arc segments defines a circular curvature over each pole face, said one of the arc segments being substantially concentric with a rotor axis of rotation.

15. A rotor according to claim 8, wherein each pole of the magnetic core comprises a pole face, and wherein the enclosure is shaped to define a circular curvature over each pole face.

* * * * *